United States Patent [19]

Shanks et al.

[11] 4,232,097
[45] Nov. 4, 1980

[54] FUEL CELL OXYGEN ELECTRODE

[75] Inventors: Howard R. Shanks; Albert J. Bevolo; Gordon C. Danielson, all of Ames, Iowa; Michael F. Weber, Wichita, Kans.

[73] Assignee: The United States of America as represented by the United States Department of Energy, Washington, D.C.

[21] Appl. No.: 18,211

[22] Filed: Mar. 7, 1979

[51] Int. Cl.$^3$ .............................................. H01M 4/92
[52] U.S. Cl. .................................. 429/44; 204/38 R
[58] Field of Search ................ 429/40, 44; 204/290 R

[56] References Cited

U.S. PATENT DOCUMENTS

| | | | |
|---|---|---|---|
| 3,502,506 | 3/1970 | Broyde | 429/40 |
| 3,544,378 | 12/1970 | Broyde | 429/44 |
| 3,737,344 | 6/1973 | Benda et al. | 429/40 |

Primary Examiner—Donald L. Walton
Attorney, Agent, or Firm—James E. Denny; Frank H. Jackson; James W. Weinberger

[57] ABSTRACT

An oxygen electrode for a fuel cell utilizing an acid electrolyte has a substrate of an alkali metal tungsten bronze of the formula: $A_xWO_3$ where A is an alkali metal and x is at least 0.2, which is covered with a thin layer of platinum tungsten bronze of the formula: $Pt_yWO_3$ where y is at least 0.8.

8 Claims, 1 Drawing Figure

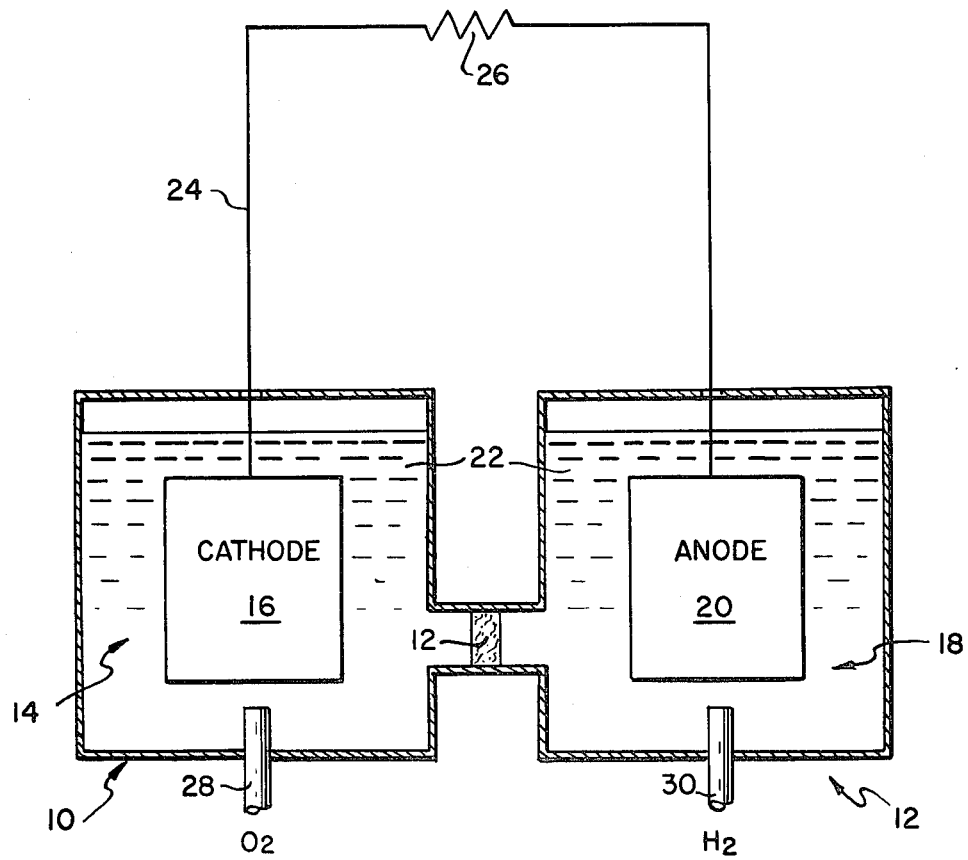

FUEL CELL OXYGEN ELECTRODE

CONTRACTUAL ORIGIN OF THE INVENTION

The invention described herein was made in the course of, or under, a contract with the UNITED STATES DEPARTMENT OF ENERGY.

BACKGROUND OF THE INVENTION

This invention relates to an improved oxygen electrode for fuel cells utilizing an acid electrolyte and to a method for preparing the same.

Fuel cells are basically galvanic energy conversion devices which circumvent the limitations of the Carnot cycle. Conversion efficiency, therefore, can be high as compared with other conversion methods. Other considerations favor fuel cells in addition to high conversion efficiency. Since they are primarily low temperature conversion devices, they are largely without polluting emissions. Fuel cells are versatile with respect to size and power level which is partly reflected by an adaptability to modular design. Also important, fuel cells require few moving parts and therefore promise to be quiet, reliable and comparatively maintance-free.

As energy conversion devices, fuel cells are distinguished from conventional batteries by the fact that the electrodes are invariable and catalytically active. Current is generated by reaction on the electrode surfaces which are in contact with a suitable electrolyte and fuel or oxidant. As a rule, fuel and oxidant are not an integral part of the cell, but are supplied as required by the current load, and reaction products are continuously removed.

The nature of the fuel is a critical aspect of cell operation. Hydrogen combustion with air or oxygen is by far the most important reaction for power generation in a fuel cell, although fuels such as hydrazine and oxidants such as hydrogen peroxide are under consideration for specialized purposes.

For example, a typical hydrogen-air or oxygen cell consists of a container divided in two by a porous separator and filled with an acid electrolyte each half containing an electrode. The electrode reactions are comprised of the oxidation of hydrogen on the anode or negative electrode to hydrated protons with the release of electrons; and on the cathode the reaction of oxygen with protons to form water vapor with the consumption of electrons. Electrons flow from the anode through the external load to the cathode and the circuit is closed by ionic current transport through the electrolyte.

The electrode, in its catalyzed layer must provide a number of sites where gases and electrolyte can react. The electrode must also provide a path for current to flow to the terminals and in some cell designs may serve to contain the electrolyte.

Electrodes, particularly those for use in an acid electrolyte such as sulfuric or phorphoric acid, often times are constructed of platinum or of a layer of platinum on a electrically conductive substrate, such as carbon. However, electrodes such as these still require the use of a substantial quantity of expensive platinum metal to provide a sufficient number of catalytic sites in order to obtain adequate cell activity. Furthermore, the catalytic reaction is oftentimes destructive of the electrodes, particularly at the cathode or oxygen electrode.

SUMMARY OF THE INVENTION

A fuel cell electrode has been prepared which has a catalytic activity equal to platinum electrodes, but which contains less platinum than most other platinum electrodes and is therefore less expensive, and which has been found to be more corrosion resistant than are most platinum metal electrodes. The fuel cell electrode of the invention comprises a substrate of tungsten bronze crystal of the formula: $A_xWO_3$ where A is an alkali metal and x is at least 0.2 and a thin layer of platinum tungsten bronze of the formula: $Pt_yWO_3$ where y is at least 0.5 on the tungsten bronze crystal. The electrode is suitable for use in fuel cells which utilize an acid electrolyte such as sulfuric acid or phosphoric acid and may be used as either the hydrogen (anode) or oxygen (cathode) electrode although preferably it may find more utility as an oxygen electrode because of the increased corrosion to which that electrode is subjected.

It is therefore one object of the invention to provide an improved electrode for use in fuel cells.

It is a further object of the invention to provide an improved electrode for use in hydrogen-oxygen fuel cells which utilize an acid electrolyte.

It is another object of the invention to provide an improved corrosion-resistant platinum containing electrode for use in hydrogen oxygen fuel cells which utilize an acid electrolyte.

Finally, it is the object of the invention to provide a method for making an improved corrosion-resistant platinum containing electrode for use in hydrogen-oxygen fuel cells which utilize an acid electrolyte.

BRIEF DESCRIPTION OF THE DRAWING

The FIGURE is of a schematic drawing of a simple hydrogen-oxygen fuel cell which utilizes the electrode of the invention.

DETAILED DESCRIPTION OF THE PREFERRED EMBODIMENT

These and other objects of the invention may be met by an electrode which comprises an electrically conductive substrate of sodium tungsten bronze of the formula: $Na_xWO_3$ where x is at least 0.2, containing a thin layer, on the surface of the substrate, of platinum tungsten bronze having the formula: $Pt_yWO_3$ where y is at least 0.5.

Referring now to the FIGURE, fuel cell 10 is divided by a porous barrier 12 into a cathode half 14 containing a platinum tungsten bronze electrode 16 and an anode half 18 containing an anode electrode 20 which may be platinum tungsten bronze, platinum or of another suitable electrically conductive material. Cell 10 is filled with electrolyte 22. Cathode electrode 16 is connected by conductor 24 through electrical load 26 to anode electrode 20. An oxygen inlet 28 in cathode half 14 is directed to flow oxygen over cathode 16 while an hydrogen inlet 30 in anode half 18 is directed to flow hydrogen gas over anode 20 to complete the cell.

In operation, hydrogen gas from inlet 30 flows over anode 20 which oxidizes the hydrogen to produce electrons which flow through conductor 24 and load 26 to cathode 16. Hydrogen ions in electrolyte 14 travel through barrier 12 to cathode half 14 where they combine with oxygen flowing from inlet 28 and electrons at cathode 16 to form water and produce electric current in the circuit.

The word "bronze" as used herein refers to a group of nonstoichiometric compounds of the general formula $A_xBO_3$. Tungsten bronze refers to $A_xWO_3$. The bronzes are different from and have no connection with the "classical bronze" metal based on copper alloys. In general, the value of x for the various bronzes is substantially continuously variable between zero and one. Several different crystal structures are observed in the system, however, such as cubic tetragonal, hexagonal and orthorambic. The structure observed depends upon the value of x for the composition of a given crystal. Generally for the purposes of providing a suitable substrate material having adequate electrical conductivity, x should be at least 0.2 and may vary up to 1.0.

Single tungsten bronze crystals may be prepared by fused salt electrolysis of the appropriate tungstate and $WO_3$. For example to prepare sodium tungston bronze, sodium tungstate $Na_2WO_4$ is mixed in appropriate proportions with tungstic acid $WO_3$ in a crucible of electrical ceramic glazed on the interior with a lead free glaze, and heated until they melt. A current is then passed between two electrodes in the molten mixture. For this purpose, a chromel wire may be used as the cathode and graphite as the anode. The graphite is preferable connected to a thin wall metal tube covered with a sleeve of quartz. Oxygen is produced at the anode and the crystal is grown on the cathode.

The tungsten bronze used for the substrate is preferably the sodium bronze although any of the alkali metal bronzes such as lithium, potassium, rubidium or cesium will be suitable as long as they provide adequate electrical conductivity.

The electrocatalyst electrode of the invention is prepared from the alkali metal tungsten bronze substrate by replacing the surface alkali metal with platinum to form $Pt_yWO_3$. In order to accomplish this, the alkali metal tungsten bronze must first be anodized by placing the crystal in an acid such as 0.2 to 0.4 HCl and passing an anodic current of up to 1 mA/cm$^2$ through the crystal. This apparently removes the alkali metal ion from the outer several layers of the crystal structure. After anodizing is complete, the platinum can be applied by several methods. For example, after anodizing the electrode, a small amount of chloroplatinic acid ($7.5 \times 10^{-5}$M $H_2PtCl_6$) may be added to the HCl electrolyte and the potential on the electrode reversed to make it a cathode. The amount of $Pt_yWO_3$ formed has been found to be proportional to the plating time up to a critical time when all alkali sites are filled on the surface.

Alternatively, a platinum electrode may be used as a counter electrode for cycling a preanodized bronze electrode between about 0.2 V and 1.8 V NHE at a sweep ratio of about 100 mV/sec in the HCl electrolyte for 10 to 15 hours or until the alkali metal sites have been filled with platinum.

In still another method, a large platinum electrode may be cycled between 0.0 V and 1.5 V NHE for about 3.5 hours in 0.1 N $H_2SO_4$ using a hydrogen-gold counter electrode. Oxygen is then passed through the solution and an alkali metal bronze electrode is inserted. The metal bronze electrode is then anodized at 400 nA/cm$^2$ for about 1.5 hours, after which the potential is reversed and a cathodic current of about 400 nA/cm$^2$ is applied for a period of time until all of the alkali metal sites on the surface of the electrode are filled.

The precise depth of the surface layer of $Pt_yWO_3$ on the alkali metal tungsten bronze substrate which is required to catalyze the reaction is not known but is thought to be only several atomic layers thick since this is the only surface which has contact with the oxygen in the electrolyte. The value for y should be at least 0.5 and preferably between 0.8 and 1.0 order to ensure a sufficient number of catalytic sites on the surface of the electrode.

The precise method by which the electrode of the invention acts as an electrocatalyst is not known. Although we do not wish to be bound by the explanation, it is thought that by replacing the alkali metal sites on the surface of the crystal with platinum metal, that in some manner the surface of the electrode acts as if the entire surface is covered with platinum metal rather than the platinum being present in a number of sites in the crystal lattice.

EXAMPLE

A hydrogen-oxygen fuel cell was constructed to evaluate sodium tungsten bronze doped with small amounts of platinum as a cathode for the oxygen reaction. A 50 cm$^2$ electrode was prepared by cementing thin layers of $Na_{0.7}WO_3$ onto both sides of a graphite substrate using a conduction silver paste as cement. The electrode was then totally potted in epoxy and then lapped down to the surface of the bronze. This resulted in an electrode with only conducting bronze exposed to the electrolyte. The electrode was anodized in HCl and then doped with a small amount of platinum from chloroplatinic acid as described above.

The anode for the cell was a 20 cm$^2$ sheet of platinum coated with platinum black.

The fuel cell fabricated from glass consisted of two components, one for the anode and one for the cathode, separated by a glass frit. The electrolyte was 0.1 N $H_2SO_4$ made from conductivity water and 99.9999% pure $H_2SO_4$.

After some initial adjustments to the hydrogen and oxygen flow and the measurement circuit, open circuit voltages ($V_{oc}$) between 0.75 and 0.80 volts were obtained. The short circuit current ($I_{sc}$) was 23.5 m$_A$. It appears that shorting the cell to obtain $I_{sc}$ causes nonreversible damage since we could not return to the high $V_{oc}$. Although the cell had been shorted several times to obtain values for $I_{sc}$, it was decided to run the cell for an extended period at an intermediate load of about 100 ohms.

On the 100 ohm load, the cell maintained a voltage of 0.295 V and a current of 2.65 mA for approximately 350 hr. At the end of this time serious deterioration of the Pt anode was observed. Both current and voltage dropped rapidly and the run was terminated. No visual change could be observed on the tungsten bronze cathode although large pieces of the Pt anode fell off.

It is possible that the deterioration of the anode also was involved with the nonreversible changes in $V_{oc}$ after the cell was shorted. It is also clear that the glass frit between the two chambers caused a large internal cell resistance further reducing performance.

Thus it can be seen from the preceding discussions and examples, that the electrode of this invention provides an effective and economical oxygen electrode for use in hydrogen-oxygen fuel cells.

The embodiments of the invention in which an exclusive property or privilege is claimed are defined as follows:

1. A cathode for use in a hydrogen-oxygen fuel cell comprising:

a substrate of electrically conductive tungsten bronze crystal of the formula $A_xWO_3$ where A is an alkali metal selected from the group consisting of sodium, potassium, lithium, rubidium and cesium and x is at least 0.2 and a catalytic layer on the substrate wherein the alkali metal ions of the substrate have been replaced by platinum ions to form a platinum tungsten bronze of the formula $Pt_yWO_3$ where y is at least 0.5.

2. The electrode of claim 1 wherein the alkali metal is sodium.

3. The electrode of claim 2 wherein y is 0.8.

4. The electrode of claim 3 wherein the substrate and catalytic layer are a single crystal.

5. In combination with a hydrogen-oxygen fuel cell which includes an anode, a cathode and an acid electrolyte positioned therebetween and communicating with the anode and cathode, the improvement which comprises the cathode, wherein the cathode consists of a substrate of electrically conductive tungsten bronze crystal of the formula $A_xWO_3$ where A is an alkali metal selected from the group consisting of sodium, potassium, lithium, rubidium and cesium and x is at least 0.2, and a catalytic layer on the substrate wherein the alkali metal ions of the substrate have been replaced by platinum ions to form a platinum tungsten bronze having the formula $Pt_yWO_3$ where y is at least 0.5.

6. The combination with a fuel cell of claim 1 wherein the alkali metal is sodium.

7. The combination with a fuel cell of claim 6 wherein y is 0.8.

8. The combination with a fuel cell of claim 7 wherein the electrode is a single crystal.

* * * * *

Disclaimer 4,232,097.—*Howard R. Shanks; Albert J. Bevolo;* and *Gordon C. Danielson,* Ames, Iowa; and *Michael Francis Weber,* Wichita, Kansas. FUEL CELL OXYGEN ELECTRODE. Patent dated Nov. 4, 1980. Disclaimer filed Apr. 1, 1981, by the assignee, *The United States of America as represented by the United States Department of Energy.*

Hereby enters this disclaimer to claims 1 through 8 of said patent.

[*Official Gazette June 9, 1981.*]